Dec. 5, 1939.   P. H. E. DE GAVARDIE   2,182,722
GUN TURRET FOR AIRCRAFT
Filed June 18, 1937   2 Sheets-Sheet 1
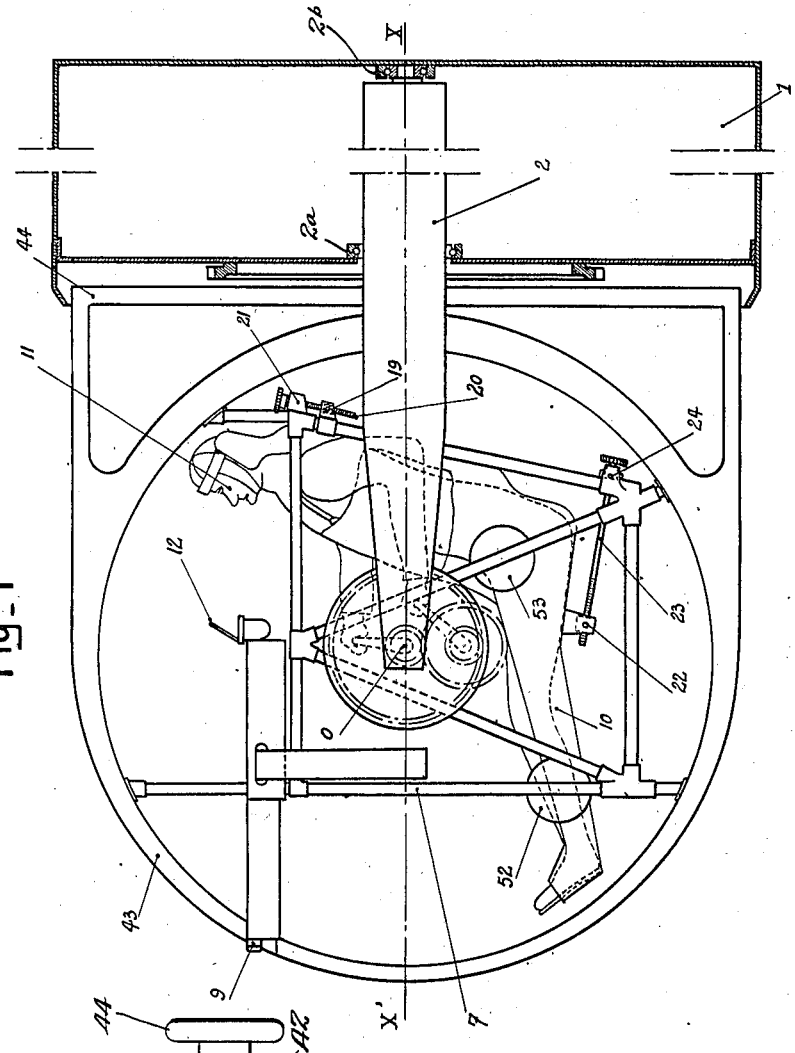

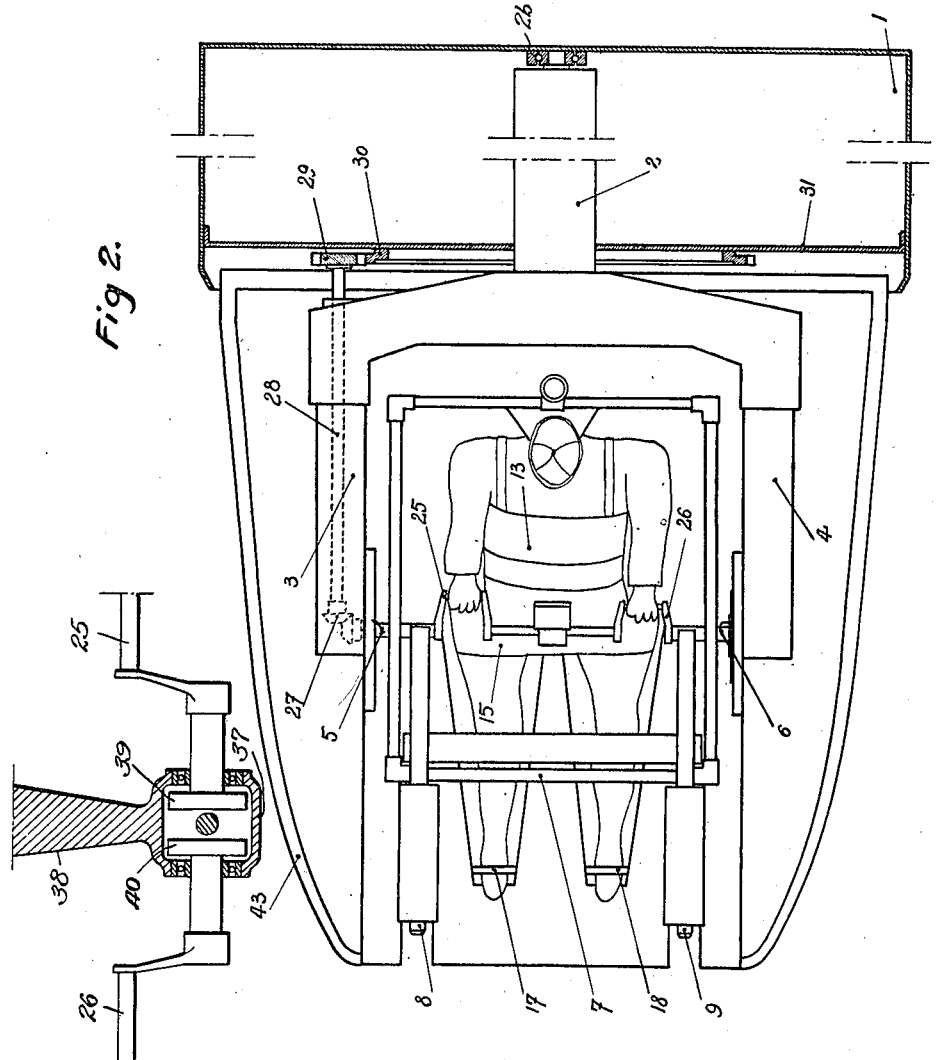

Patented Dec. 5, 1939.

2,182,722

UNITED STATES PATENT OFFICE 2,182,722

GUN TURRET FOR AIRCRAFT

Pierre Henry Edmond de Gavardie, Paris, France

Application June 18, 1937, Serial No. 149,021
In France June 20, 1936

1 Claim. (Cl. 89—37.5)

The present invention relates to gun turrets and more particularly pertains to means for mounting machine guns on airplanes.

Machine gun fighting between airplanes presents difficulties arising principally from the fact that the combating planes are capable of moving in many directions and at high speeds and the speed in the direction in which each plane is moved may be altered quickly so that a very short space of time is provided for the gunner to aim the weapons to directly fire thereof on an enemy plane.

An object of the present invention is to provide a gun turret allowing universal movement of the gun and providing means for supporting and moving the gunner in a fixed relation with respect to the weapon so that the machine guns may be more efficiently trained on an enemy plane.

Another object of the invention includes control means for a universally supported cage in which the gunner is seated so that the cage and the guns may be manually moved as a unit whereby the gunner will be in a position to take proper aim on the moving target provided by another airplane.

Other and further features and objects of the invention will be apparent to those skilled in the art upon consideration of the accompanying drawings and the following description wherein an exemplary embodiment of the invention is disclosed.

In the drawings:

Figure 1 is an elevational view of the cage for supporting the gunner and the weapons illustrating the manner in which a turret may be mounted on the fuselage.

Figure 2 is a plan view of the turret shown in Fig. 1.

Figure 3 is a sectional view partly in elevation illustrating the mechanism for transmitting motion to the turret cage.

Figure 4 is a view partly in section illustrating the means for securing the turret cage in a fixed position.

Referring to the drawings the front part of the fuselage is indicated at 1 and a stem 2 of a fork-like member having two prongs 3 and 4 is mounted in bearings 2a and 2b at the front part of the fuselage. The prong-like members 3 and 4 are provided with bearings 5 and 6 in which a cage 7 is pivotally supported. The cage is formed of tubes providing a skeleton structure for supporting the machine guns 8 and 9. The cage is provided with a trough-like seat 10 adapted to accommodate a gunner as indicated at 11. It will be noted that the cage is suspended in a univeral fashion since the fork can turn about the axis X—X' in the bearings 2a and 2b of the fuselage and the cage can also turn in the bearings 5 and 6 so that the machine guns 8 and 9 and the gunner 11 are simultaneously moved so as to aim the guns in any desired direction.

The gunner may be securely held within the seat 10 by means of a strap 13 arranged around the chest portion of the gunner and a strap 15 arranged to encircle the thighs. The feet of the gunner are securely held in position by straps 17 and 18.

The sighting device 12 is arranged between the machine guns 8 and 9. The position of the gunner with respect to the sighting device may be changed by means of a pivotally mounted nut 19 which is engaged by a rotatable screw 20 which is mounted to pivot in the bracket 21. The lower part of the trough-like seat 10 can also be moved to vary the position of the gunner with respect to the sighting device 12 by means of an elongated screw 23 which engages the nut supported in the bracket 22. The other end of the screw 23 is pivotally supported as indicated at 24. The leg supporting portions of the seat are guided by the abutments 52 and 53 and by turning the screws 20 and 23 the position of the gunner may be adjusted so that his eyes will be in proper position with respect to the sighting device 12. Such adjustments of the seat will also cause the center of gravity of the cage to be at the axis of the bearings 5 and 6 or the point indicated at 0 in Fig. 1.

The arms of the gunner are thus free to manipulate the turret and two independent cranks 25 and 26 are provided for moving the turret. The crank 25 is mounted to turn in the bearing 5 and rotate the bevel gear wheels 27 to transmit motion to a shaft 28 which is housed within the pronglike member 3 of the fork. The shaft 28 carries a pinion 29 which meshes with a spur-wheel 30 fixed to the front plate 31 of the fuselage. Thus by turning the crank 25 the prongs 3 and 4 of the fork and the cage 7 will be turned about the axis X—X'.

The crank 26 is provided for rotating the cage about the axis of the bearings 5 and 6. The mechanism for effecting such rotation of the cage is more clearly shown in Fig. 3 and includes a gear wheel 32 at the end of a crank shaft which meshes with the gear wheel 33.

The gear wheel 33 is provided with a pinion 34 which meshes with the teeth 35 of a ring member 35a. The ring member 35a is secured to the prong 4 of the fork member so as to cause the cage 7 to turn about the axis of the bearings 5 and 6.

The cage may be housed within a transparent cover (not shown) which is secured to the wall member indicated at 36 in Fig. 3 which also provides means for supporting the bearings of the gear wheels 33 and 34.

The independent cranks 25 and 26 are supported in the bearings 5 and 6 and in bearings provided in a bracket 38 as shown in Fig. 3. The bracket 38 is provided with a housing 37 in which the shafts of the cranks 25 and 26 terminate. The crank shaft 25 is provided with a disc 39 and the crank shaft 26 carries a disc 40 which discs rotate within the housing 37.

The crank shafts may be secured in any rotated position by means of brake shoes 41 and 42 which may be forced into engagement with the periphery of the discs. The brake mechanism may be actuated by a hand wheel 44 which causes a screw 54 to move the brake shoes 41 and 42 towards each other. The transparent cover for the gunner (not shown) may also be supported on the hemispherical frame 43 as shown in Figure 1 which terminates in a flat sheet 44.

In operation of the device the guns 8 and 9 may be trained on an enemy plane by manipulation of the cranks 25 and 26. The crank 25 is employed to rotate the cage 7 about the axis X—X' and the crank 26 is moved to rotate the cage about the axis of the bearings 5 and 6. Thus the guns may be directed at any angle with respect to the body or the fuselage 1 of the airplane.

While the invention has been described with reference to specific structural details it is to be understood that changes will be made therein by those skilled in the art. Such changes may be made without departing from the spirit and scope of the invention as set forth in the appended claim.

What I claim is:

A gun turret for aircraft including in combination a universal suspension, a movable unit comprising a gunner's cabin, a seat and a weapon, said unit being supported substantially at its centre of gravity by the universal suspension, the weapon being rigidly secured to the gunner's cabin, control means adapted to be manually operated for rotating the said movable unit respectively about the two axes of the universal suspension for the purpose of pointing the said weapon toward any direction in space, said manual control means including two separate hand wheels mounted on each side of said seat on an axis passing substantially through the center of gravity of said movable unit, means for securing said movable unit in each position to the body of the aircraft, said securing means including a brake acting simultaneously on the two hand wheels controlling said movable unit.

PIERRE HENRY EDMOND DE GAVARDIE.